INVENTOR:
RONALD E. RICHARDSON

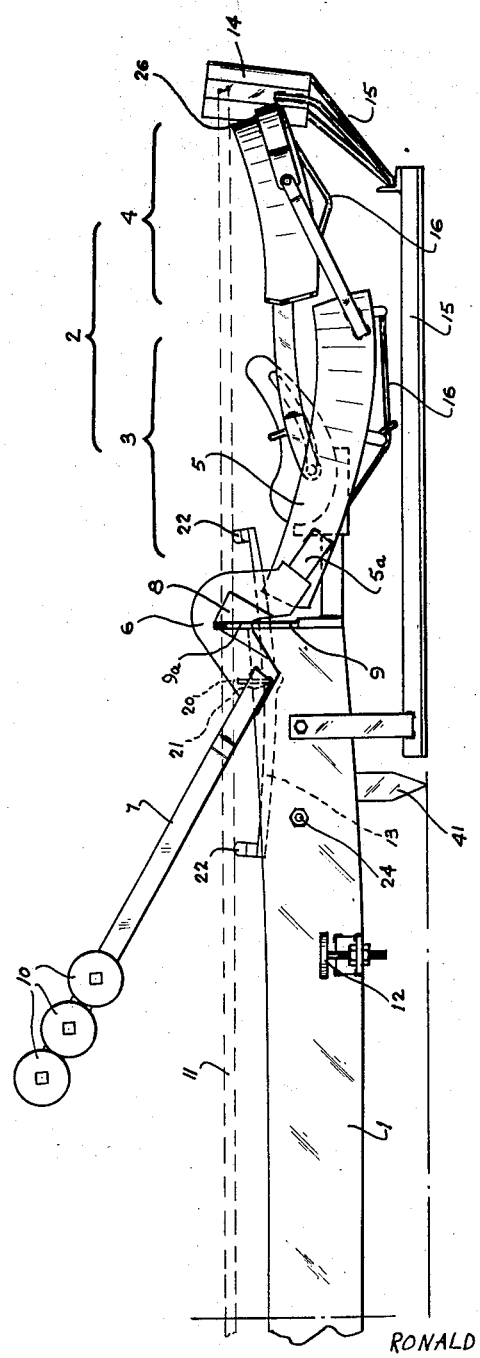

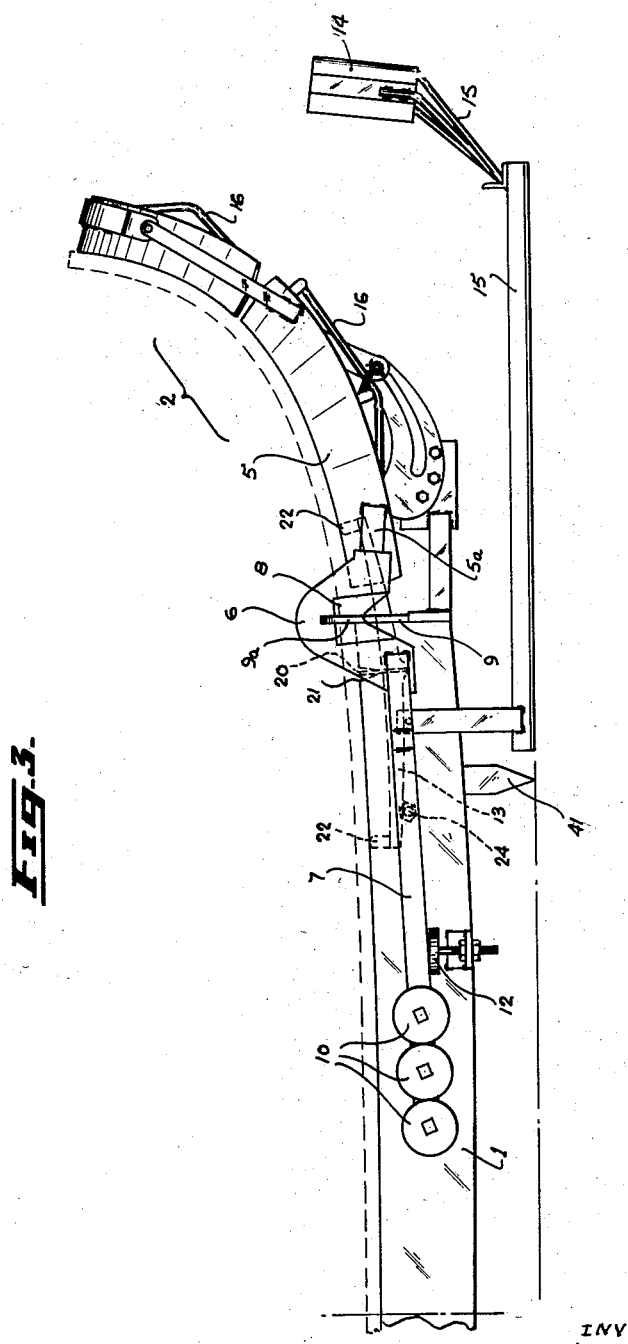

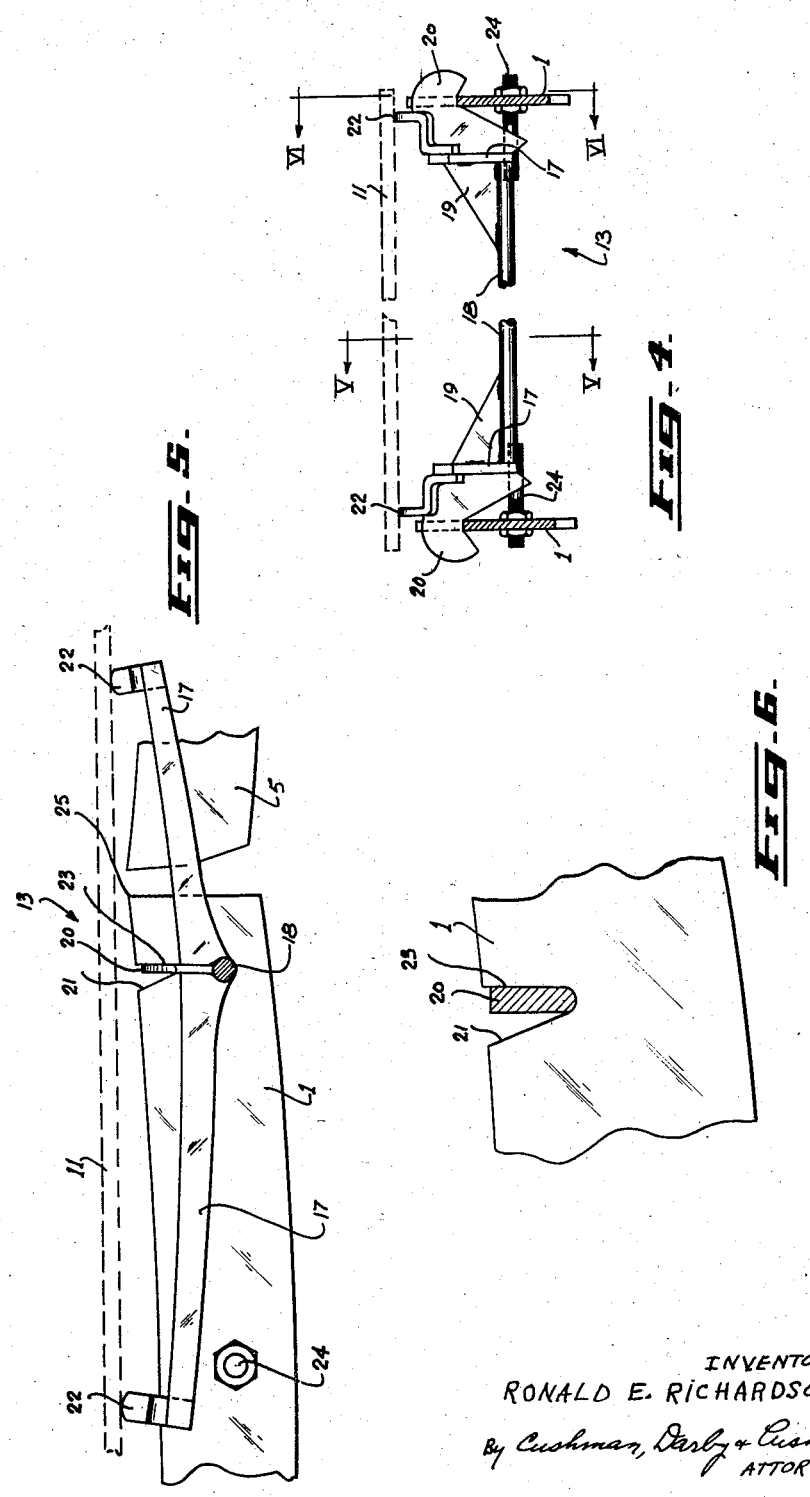

Patented Nov. 25, 1958

2,861,395

GLASS BENDING MOULDS

Ronald E. Richardson, Oshawa, Ontario, Canada, assignor to Pittsburgh Plate Glass Company, Pittsburgh, Pa.

Application June 18, 1956, Serial No. 592,194

Claims priority, application Canada July 2, 1955

5 Claims. (Cl. 49—67)

This invention relates to improvements in the construction of moulds of the concave type such as are employed in the bending of elongated glass sheets to curved form. The advent of "wrap-around" windshields in automobile design has given rise to the need for efficient moulds for the initial processing of the elongated glass sheets that will ultimately form the laminated safety glass of such "wrap-around" windshield. A "wrap-around" windshield consists of an elongated sheet of laminated glass of gentle curvature at its centre, the radius of curvature decreasing sharply at each end until the glass is extending almost perpendicular to the main body of the glass.

The technique employed in forming such "wrap-around" windshields, or like objects of curved laminated glass, for automobile rear windows or other applications, is to lay a pair of flat elongated glass sheets on a mould which is so arranged as to tend to take up its final configuration when so permitted by the softening of the glass. The mould with the glass sheets thereon is passed through a furnace in which the glass is raised to a temperature sufficient to render it yieldable to the forces exerted upon it by the mould. In this manner the required shape is imparted to the glass. Subsequently the two sheets are annealed, an intermediate lamination of a synthetic resinous material is placed between them and they pass to the rolling and pressure treatments before emerging as a finished product. A similar bending operation is employed in manufacturing the tempered type of non-laminated safety glass.

The present invention is concerned with the construction of moulds of the concave type for the preliminary bending of one or more such sheets during passage through a furnace.

It has become the practice to form moulds for this purpose with pivoted end portions each of which either can be swung into a downward position (when the flat, cold glass is originally placed in position thereon—subsequently referred to as the "flat" position of the mould), or can move upwardly into an upright position (the "concave" position of the mould) as the resistance to bending of the glass decreases on exposure to higher temperatures. Weights tending to urge the movable portions of the mould into such latter positions are normally provided.

The present invention is directed towards providing additional support for the glass at points intermediate between the normal points of support provided by the mould parts. This additional support is then available during the actual bending operation, i. e. at a time when the glass begins to soften but before it has assumed its final shape.

The invention may be broadly defined as consisting of the provision, in a glass bending mould of the type described, of a supporting device pivotally mounted on one of said mould portions about an axis parallel to the axis of relative pivoting of said mould portions, said supporting device having elevated supporting surfaces disposed at points near the edges of the mould and on opposite sides of the pivotal axis of the supporting device whereby in the "flat" position of the mould to project upwardly therefrom in glass-supporting disposition and in the concave position of the mould to lie so as not to project from the curved surface defined by the glass-supporting edges thereof.

One half of a concave skeleton mould embodying the invention is illustrated by way of example in the accompanying drawings. The other half of the mould is identical in mirror image, and has thus not been illustrated.

Figure 2 is a side view of the mould half seen in Figure 1, with the parts in the same position;

Figure 3 is a view similar to Figure 2 but with the parts in the concave position assumed after bending of the glass;

Figure 4 is a view of the glass-supporting device that forms the subject of the present invention, as seen in a direction from the end of the mould, i. e. the right-hand side of Figure 2 or Figure 3, certain parts being shown in section to reveal the pivotal mounting of the device;

Figure 5 is a section on the line V—V of Figure 4; and

Figure 6 is an enlarged fragmentary section on the line VI—VI of Figure 4.

Figure 1:
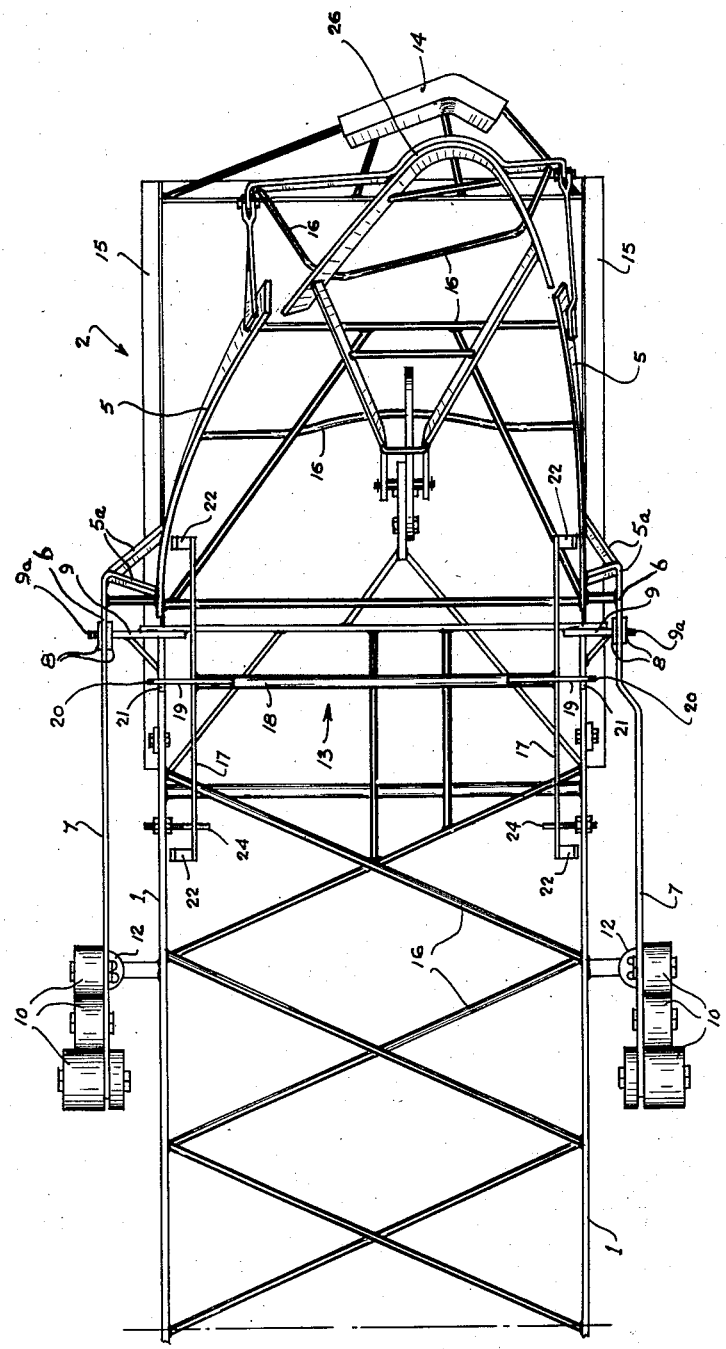
Figure 1 shows a plan view of the mould half in the initial "flat" position of the parts prior to bending of the glass.

The main side bars of the mould are each designated by the reference numeral 1, the movable end portion at the end of the mould visible in the drawings being shown generally at 2. This movable end portion 2 is itself composed of two relatively movable mould sections 3 and 4. The detailed structure of the end portion 2 of the mould and the nature of the relative movement between the sections 3 and 4 forms the subject matter of co-pending United States patent application, Serial No. 591,913, and will not be further elaborated upon in this specification. Suffice to say that the mould section 3 consists of a pair of side bars 5, each of which is arranged, in the concave position of the mould (Figure 3), to form a contiguous smooth continuation of a main side bar 1. The end of each side bar 5 adjacent the end of a main side bar 1 is secured by suitable struts 5a to an arched bracket 6 to which there is further secured an arm 7 extending generally away from the end portion 2 and, when the parts are in the "flat" position of Figures 1 and 2, upwardly at an angle approximately equal to that through which it is desired to pivot the end portion 2 of the mould. Each of the brackets 6 carries a pair of reinforcing side plates 8 secured to each side surface of such bracket.

The two brackets 6 serve to mount the movable end portion 2 on a pair of vertical plates 9 terminating in upwardly projecting fingers 9a and each secured to an end of one of the main side bars 1. The structure and function of the pivotal mounting so produced forms the subject matter of co-pending United States patent application, Serial No. 592,111, to which reference may be had for additional details. It is only necessary to explain in the present specification that a set of weights 10 secured to the free end of each of the arms 7 has the effect of tending to rotate the end portion 2 in an anti-clockwise direction from the "flat" position seen in Figure 2 to the concave position seen in Figure 3. As will appear from such latter figure, in the fully rotated position, the arms 7 come to rest each against an adjustable stop 12, the position of which thus determines the limit of anti-clockwise rotation of the end portion 2. As best seen from Figure 1, the arms 7 are disposed outwardly of the side members 1 in order to be free to move downwardly without encountering the glass sheet which overlaps the edges of the bars 1 by a small amount (generally about half an inch).

Normally, in practice, when the mould is being employed as a step in the manufacture of laminated windshields, two sheets of glass, one on top of the other, will be laid on top of the mould so as to be bent simultaneously and thus always match one another perfectly. This pair of glass sheets is shown diagrammatically by broken lines 11 in Figures 2 and 3. The weight and rigidity of the glass 11 will initially prevent upward movement of each of the end portions 2 of the mould, the tip 26 of each end portion 2 being held down by the underside of the glass 11 at its extreme end. The parts will remain in the position seen in Figure 2, against the force exerted by the weights 10, until the glass begins to soften as a result of increasing temperatures that it encounters on being fed on a continuously moving belt through an oven. Gradually the upward bending force exerted by the weights 10 will take charge and the glass will allow each of the end portions 2 to swing slowly and uniformly upward until the arms 7 come to rest on the stops 12. The parts will then be in the position illustrated in Figure 3, and the glass 11 will be smoothly bent to the required shape. It will be noted that the main body of the glass also sags sufficiently to bring its edges into contact with the full length of the side bars 1. The degree and area of application of heat, combined with the comparatively narrow transverse dimension of the mould, normally permit no significant transverse sagging of the glass, although transverse sagging can be provided for if desired.

The parts of the mould so far described are either common to the prior art or else form the subject of one of said co-pending applications. The improvement that forms the subject of the present invention resides in the provision of an additional supporting device for the glass during the process of bending. This device, which is pivotally mounted on the main portion of the mould, is known as a "teeter" and is indicated generally in the drawings by the reference numeral 13.

As best seen from Figures 4, 5 and 6 which show the teeter 13 in detail, this device consists of a pair of arms 17 joined together by a rod 18 to each end of which there is secured a vertical plate 19 that terminates in a hooked projection 20 arranged to engage in a V-shaped notch 21 formed in the upper edge of each of the side bars 1 at a point near its end adjacent a side bar 5. Each of the arms 17 is disposed on the inner side of a side bar 1 in parallel, closely spaced relationship therewith, and each arm 17 carries at each of its ends an upstanding lug 22 forming a supporting surface for the glass 11. The lugs 22 are bent to bring their upper edges to lie in planes very close to the planes of the side bars 1 and 5, as best seen from Figures 1 and 4. Pivotal movement of the teeter 13 is limited in one direction (clockwise as seen in Figures 5 and 6) by abutment of the surfaces of the hooked portions 20 of the plates 19 against sides 23 of the V-shaped notches 21, and in the other direction (anti-clockwise as seen in Figures 5 and 6) by a pair of stops 24 extending inwardly from the inner edges of the sides bars 1. The weight distribution within the teeter 13 is such as to bias it towards this extreme anti-clockwise position.

When the cold glass sheet 11 is placed on the mould it will rest not only on the two extreme tips 26 of the end portions 2, but also on the eight lugs 22 of the two teeters 13 arranged at each end of the mould. In this position, the glass will normally be held slightly above the extreme upper tips 25 of the ends of the bars 1. This position is shown in all the figures except Figure 3, the relationship between the glass and the teeter being best appreciated from Figure 5.

As the glass begins to soften and the weights 10 become effective to pivot upwardly the end portions 2 of the mould, the teeters 13 will slowly pivot about their mountings on the bars 1 so as to follow the contour of the glass as it is gradually bent, while continuing to provide support for the same on both sides of the pivotal axis of each end portion 2, such pivotal axis being determined by the plates 9. Eventually, when the glass 11 has been bent to its final shape and the parts have assumed the concave position seen in Figure 3, each teeter 13 will have been swung through its full throw and further movement will be prevented by the stops 24. In this final position, the lugs 22 lie just below the curved surface of the glass 11, the contour of which surface is now defined by the bars 1 and 5 with which these portions of the edges of the glass are in continuous contact. In this position, the lugs 22 just fail to touch the glass, no further support for it being required. Indeed any pressure between the lugs and the glass might prove harmful as likely to mar the glass which is now in the softest condition achieved during the bending process.

The construction of the teeter 13 is such that the main body of metal of which it is composed is spaced well below the glass sheet. This tends to minimize any local cooling effects that the metal of the teeter might otherwise exert on sections of the glass. On the other hand, the pivotal axis of the teeter is arranged to be as high as possible to minimize relative sliding movement between the lugs 22 and the surface of the glass when the teeter tilts.

The other parts of the mould visible in the drawings are: a thermal ballast device 14, the function of which is described in the first mentioned of said co-pending applications concerned with the construction and operation of the end portion 2; supporting members 15 for such thermal ballast device 14; conventional bracing members 16 extending between the side bars 1 and between parts of the end portions 2, such as side bars 5; conventional supporting legs 41; and other parts not germane to the present invention and described in detail in the former of said co-pending applications. Certain of the bracing members 16 that connect the parts of the sections 3 and 4 of the end portion 2 project somewhat downwardly from these sections in order to reduce the mass of metal closely adjacent the glass sheet and thus minimize local cooling effects thereon.

I claim:

1. In a glass bending mould of the concave type having two relatively pivotable mould portions movable between a "flat" position and a concave position; the provision of a supporting device pivotally mounted on one of said mould portions about an axis parallel to and closely spaced from the axis of relative pivoting of said mould portions, said supporting device having elevated supporting surfaces disposed at points near the edges of the mould and on opposite sides of both said axes whereby in the "flat" position of the mould to project upwardly therefrom in glass-supporting disposition and in the concave position of the mould to lie so as not to project from the curved surface defined by the glass-supporting edges thereof.

2. In a glass bending mould of the concave type having a first mould portion including a pair of spaced generally parallel bars and a second mould portion including a pair of spaced generally parallel bars, said second mould portion being pivotally connected to one end of said first mould portion to be movable between a "flat" position, and a concave position in which the bars of said second mould portion respectively form contiguous smoothly curved continuations of the bars of said first mould portion; the provision of a supporting device pivotally mounted on said first mould portion about an axis parallel to the pivotal axis of said second mould portion about said first mould portion, said supporting device having elevated supporting surfaces disposed at points near the bars of said mould portions and on opposite sides of both said axes whereby in the "flat" position of the mould to project upwardly therefrom in glass-supporting disposition and in the concave position of the mould to lie so as not to project from the curved surface defined by the bars of the mould portions.

3. In a glass bending mould of the concave type having a first mould portion including a pair of spaced generally parallel bars and a second mould portion including a pair of spaced generally parallel bars, said second mould portion being pivotally connected to one end of said first mould portion to be movable between a "flat" position, and a concave position in which the bars of said second mould portion respectively form contiguous smoothly curved continuations of the bars of said first mould portion; the provision of a supporting device pivotally mounted on said first mould portion about an axis parallel to and closely spaced from the pivotal axis of said second mould portion about said first mould portion, said supporting device having elevated supporting surfaces disposed at points near the bars of said mould portions and on opposite sides of both said axes whereby in the "flat" position of the mould to project upwardly therefrom in glass-supporting disposition and in the concave position of the mould to lie so as not to project from the curved surface defined by the bars of the mould portions.

4. In a glass bending mould of the concave type having a first mould portion including a pair of spaced generally parallel bars and a second mould portion including a pair of spaced generally parallel bars, said second mould portion being pivotally connected to one end of said first mould portion to be movable between a "flat" position and a concave position in which the bars of said second mould portion respectively form contiguous smoothly curved continuations of the bars of said first mould portion; the provision of a supporting device comprising a pair of arms terminating in upwardly projecting lugs having smooth upper glass-supporting surfaces, said arms being secured together in generally parallel relationship and pivotally mounted on said first mould portion about an axis parallel to and closely spaced from the pivotal axis of said second mould portion about said first mould portion, said arms being spaced apart to lie closely within the bars of said mould portions, and said arms extending across the latter axis, whereby in the "flat" position of the mould to cause said supporting surfaces to lie above the mould in glass-supporting disposition and in the concave position of the mould to cause said supporting surfaces to lie not above the curved surface defined by the bars of the mould portions.

5. In a glass bending mould of the concave type having two relatively pivotable mould portions movable between a "flat" position and a concave position; the provision of a supporting device pivotally mounted on one of said mould portions about an axis generally parallel to the axis of relative pivoting of said mould portions, said supporting device having elevated supporting surfaces arranged at points near at least one edge of the mould and disposed on opposite sides of both said axes whereby in the "flat" position of the mould to project upwardly therefrom in glass-supporting disposition and in the concave position of the mould to lie so as not to project from the curved surface defined by the glass-supporting edges thereof.

References Cited in the file of this patent
FOREIGN PATENTS

| | | |
|---|---|---|
| 1,097,088 | France | Feb. 9, 1955 |
| 745,992 | Great Britain | Mar. 7, 1956 |